United States Patent
Zeev et al.

(10) Patent No.: US 11,523,325 B2
(45) Date of Patent: Dec. 6, 2022

(54) MOBILE AD-HOC WIRELESS NETWORKS

(71) Applicant: NERAGON NETWORKS LTD, Kefar Saba (IL)

(72) Inventors: Raviv Zeev, Kefar Saba (IL); Rafi Aizenstain, Kefar Saba (IL); Rotem Almagor, Kefar Saba (IL); Tanya Manov, Kefar Saba (IL)

(73) Assignee: NERAGON NETWORKS LTD., Kefar Saba (IL)

( * ) Notice: Subject to any disclaimer, the term of this patent is extended or adjusted under 35 U.S.C. 154(b) by 15 days.

(21) Appl. No.: 17/055,713

(22) PCT Filed: May 16, 2019

(86) PCT No.: PCT/IL2019/050562
§ 371 (c)(1),
(2) Date: Nov. 16, 2020

(87) PCT Pub. No.: WO2019/220447
PCT Pub. Date: Nov. 21, 2019

(65) Prior Publication Data
US 2021/0211967 A1    Jul. 8, 2021

Related U.S. Application Data

(60) Provisional application No. 62/672,724, filed on May 17, 2018.

(51) Int. Cl.
*H04W 40/32* (2009.01)
*H04W 40/24* (2009.01)
*H04W 84/18* (2009.01)

(52) U.S. Cl.
CPC ......... *H04W 40/32* (2013.01); *H04W 40/248* (2013.01); *H04W 84/18* (2013.01)

(58) Field of Classification Search
CPC .... H04W 40/32; H04W 40/248; H04W 84/18
See application file for complete search history.

(56) References Cited

U.S. PATENT DOCUMENTS

| 2004/0001476 A1 | 1/2004 | Islam |
| 2004/0018839 A1 | 1/2004 | Andric et al. |

(Continued)

FOREIGN PATENT DOCUMENTS

| EP | 2016786 B1 | 11/2013 |
| KR | 2009 0054307 A | 5/2009 |
| WO | 2011/113289 A1 | 9/2011 |

OTHER PUBLICATIONS

Ingram, R., Radeva, T., Shields, P. et al. A leader election algorithm for dynamic networks with causal clocks. Distrib. Comput. 26, 75-97 (2013). https://doi.org/10.1007/s00446-013-0184-1.

(Continued)

*Primary Examiner* — Shukri Taha
(74) *Attorney, Agent, or Firm* — The Roy Gross Law Firm, LLC; Roy Gross

(57) ABSTRACT

A method comprising: forming a cluster comprising at least two network nodes, wherein each of said network nodes comprises at least a wireless transceiver and at least one application server; continuously acquiring, by each of said network nodes, cluster topological data from at least some of said other network nodes; continuously transmitting, by each of said network nodes, to at least some of said other network nodes, said acquired topological data; designating, based at least in part on said transmitted topological data, a cluster head; and selecting, by said cluster head, at least one of said other network nodes in said cluster to provide one or more services associated with its respective at least one application server, wherein said one or more services are provided to all other network nodes.

27 Claims, 9 Drawing Sheets

(56) References Cited

U.S. PATENT DOCUMENTS

| | | | |
|---|---|---|---|
| 2006/0002328 A1* | 1/2006 | Naghian | H04W 84/08 370/328 |
| 2007/0091838 A1* | 4/2007 | Kobayashi | H04L 45/42 370/328 |
| 2007/0201418 A1* | 8/2007 | Kobayashi | H04W 40/32 370/338 |
| 2007/0280174 A1* | 12/2007 | Pun | H04W 40/26 370/338 |
| 2009/0034432 A1 | 2/2009 | Bonta | |
| 2009/0046598 A1* | 2/2009 | Krishnaswamy | H04L 67/125 370/254 |
| 2012/0106428 A1 | 5/2012 | Schlicht | |
| 2018/0352581 A1 | 12/2018 | Segal | |
| 2019/0387458 A1* | 12/2019 | Li | H04W 48/16 |

OTHER PUBLICATIONS

International Search Report of PCT/IL2019/050562 Completed Sep. 5, 2019 4 Pages.
Written Opinion of PCT/IL2019/050562 Completed Sep. 5, 2019 4 Pages.

\* cited by examiner

MOBILE AD-HOC WIRELESS NETWORKS

CROSS REFERENCE TO RELATED APPLICATIONS

This application is a National Phase of PCT Patent Application No. PCT/IL2019/050562 having International filing date of May 16, 2019, entitled "MOBILE AD-HOC WIRELESS NETWORKS, which claims the benefit of priority under 35 U.S.C. § 119(e) of U.S. Provisional Application No. 62/672,724, filed on May 17, 2018, entitled "SYSTEM AND METHOD FOR ENABLING COMMUNICATION BETWEEN WIRELESS BUBBLES TO CREATE UNITED CLUSTER IN CLLULAR AND WIRELESS NETWORKS". The contents of the above applications are all incorporated by reference as if fully set forth herein in their entirety.

BACKGROUND

The invention relates to the field of mobile wireless communication.

A mobile ad-hoc network is a temporary network autonomously formed by terminals with mobility. The mobile ad-hoc network has been developed to temporarily form a network in an area where an infrastructure network does not exist or development of a network is not easy based on the infrastructure network, and to provide variety of communication service to end users.

Since the mobile ad-hoc network does not require the infrastructure network, it can be applied for an area where using of communication infrastructure is not available, an area where communication infrastructure does not exist such as a desert or a mountainous area, or an area where installation of the communication infrastructure is not easy. For example, an ad-hoc network can be temporarily constructed for use for military use, rescue operations, or the like.

Ad-hoc networks often need to adapt to different topologies, as devices join and depart from the network, distances change, and so do receiving qualities. These changes are particularly significant and fast when one or more devices are used in vehicles such as cars, trains, airplanes, ships or others.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: forming a cluster comprising at least two network nodes, wherein each of said network nodes comprises at least a wireless transceiver and at least one application server; continuously acquiring, by each of said network nodes in said cluster, cluster topological data from at least some of said other network nodes; continuously transmitting, by each of said network nodes in said cluster, to at least some of said other network nodes in said cluster, said acquired topological data; designating, based at least in part on said transmitted topological data, a cluster head; and selecting, by said cluster head, at least one of said other network nodes in said cluster to provide one or more services associated with its respective at least one application server, wherein said one or more services are provided to all other network nodes.

There is also provided, in an embodiment, a system comprising: at least two network nodes, each comprising at least a wireless transceiver; at least one application server; at least one hardware processor; and a non-transitory computer-readable storage medium having stored thereon program instructions, the program instructions executable by the at least one hardware processor to: form a cluster comprising said at least two network nodes, wherein each of said network nodes continuously acquires cluster topological data from at least some of said other network nodes in said cluster, continuously transmit, by each of said network nodes in said cluster, to at least some of said other network nodes in said cluster, said acquired topological data; designate, based at least in part on said transmitted topological data, a cluster head; and select, by said cluster head, at least one of said other network nodes in said cluster to provide one or more services associated with its respective at least one application server, wherein said one or more services are provided to all other network nodes.

There is further provided, in an embodiment, a computer program product comprising a non-transitory computer-readable storage medium having program instructions embodied therewith, the program instructions executable by at least one hardware processor to operate at least two network nodes, wherein each of said network nodes comprises at least a wireless transceiver and at least one application server, to: form a cluster comprising said at least two network nodes; continuously acquire, by each of said network nodes in said cluster, cluster topological data from at least some of said other network nodes; continuously transmit, by each of said network nodes in said cluster, to at least some of said other network nodes in said cluster, said acquired topological data; designate, based at least in part on said transmitted topological data, a cluster head; and select, by said cluster head, at least one of said other network nodes in said cluster to provide one or more services associated with its respective at least one application server, wherein said one or more services are provided to all other network nodes.

In some embodiments, said acquiring is only from said at least some of said other network nodes that are one-hop neighboring network nodes of said network node. In some embodiments, each of said one-hop neighboring networks is located downstream from said network node.

In some embodiments, said transmitting is only to said at least some of said other network nodes that are one-hop neighboring network nodes of said network node. In some embodiments, each of said one-hop neighboring networks is located upstream from said network node.

In some embodiments, each of said network nodes is a mobile cellular network node, and wherein each of said mobile cellular network nodes comprises at least an access radio, a core network, a backhaul radio device, and one or more application servers. In some embodiments, each of said mobile cellular network nodes comprises at least a mobile Long-term Evolution (LTE) core.

In some embodiments, said application server comprises at least one application selected from the group consisting of: voice communication, data communication, push-to-talk communication, and video communication.

In some embodiments, each of said network nodes is associated with at least one end user.

In some embodiments, each of said one or more services is provided to all end users of each of said other network nodes.

In some embodiments, said acquiring and said transmitting comprises acquiring and transmitting information regarding said at least one application server of each network node.

In some embodiments, said selecting is based, at least in part, on said information regarding said at least one application server of each network node.

In some embodiments, said selecting is based, at least in part on cluster parameters selected from the group consisting of: centralization of data path, minimization of hops among network nodes, minimization of transmission delays, network node load balancing, maximization of bandwidth, and previous selection choices by said cluster head.

In some embodiments, at least one of said network nodes turns off its respective application server when not included in said selecting.

In some embodiments, said acquiring and said transmitting comprises acquiring and transmitting network node configuration information. In some embodiments, said network node configuration information comprises at least some of: internet protocol (IP) addresses, hardware identifiers, Media Access Control (MAC) address, address of application server, type of application server, radio frequencies (RF), radio access network (RAN) parameters, and security information.

In some embodiments, each of said network nodes is configured to detect a conflict with another of said network nodes based, at least in part, on said configuration information. In some embodiments, said network node is further configured to transmit a message to said another network node, and wherein said message comprises data with respect to said detected conflict. In some embodiments, said message further comprises modified said configuration information applicable to said another network node and configured to resolve said conflict.

In some embodiments, said acquiring and said transmitting comprises acquiring and transmitting authentication information associated with at least some of said end users of said network node.

In some embodiments, each of said network nodes is configured to authenticate said at least some of said end users associated with each of said other network node, based, at least in part, on said authentication information.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system and method for the automated and efficient formation and management of ad-hoc mobile wireless network clusters comprised of a plurality of mobile network nodes.

The term "ad-hoc network" means a network structure that is temporary and its configuration and topology is subject to dynamic changes, because cores may appear, disappear and move unexpectedly. An Ad-Hoc Network can be based on single hop or/and multi-hop radio links.

Figure 1:
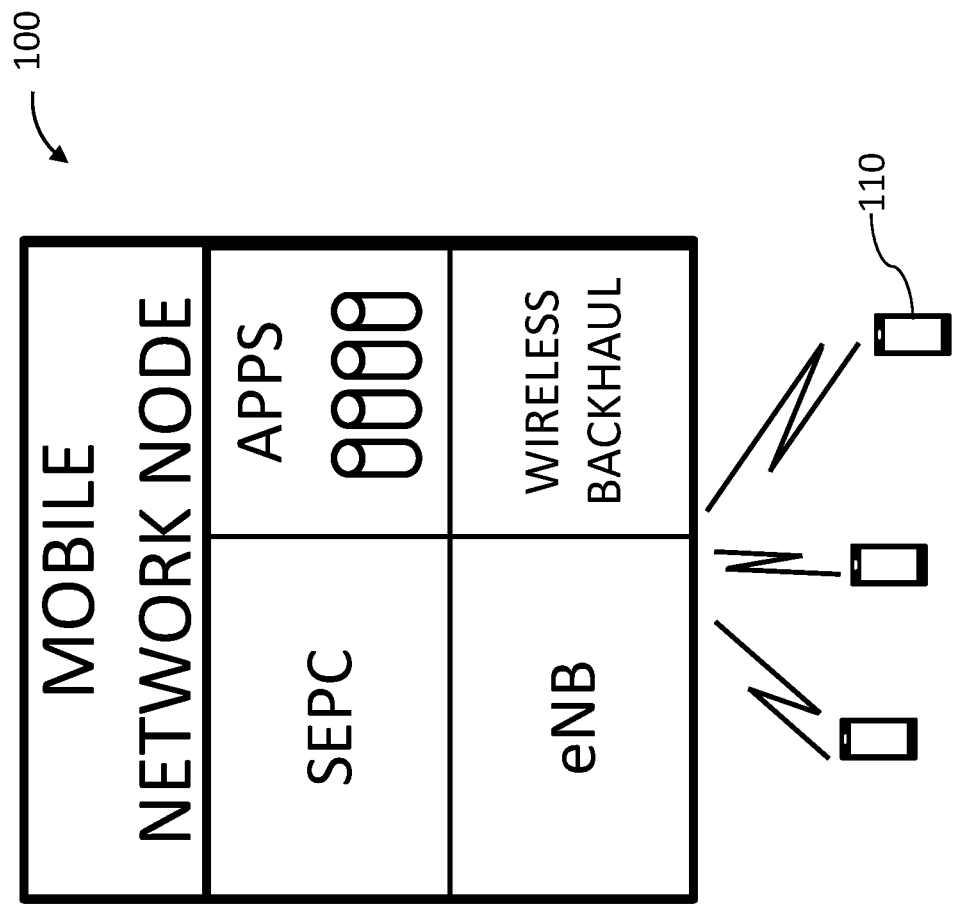
FIG. 1 is a schematic illustration of an exemplary mobile network node, according to an embodiment.

FIG. 1 is a schematic illustration of an exemplary mobile network node, according to an embodiment. In some embodiments, at least some of the network nodes of the present disclosure comprise a standalone network core which includes, e.g.:

One or more eNodeBs, gNodeBs, and/or any other standard access radios;

Evolved Packet Core (EPC) or smart EPC;

ne or more application servers; and a wireless transceiver, such as a Long-term Evolution (LTE) CPE that acts as the node backhaul and searches constantly to connect to other nodes.

In some embodiments, the present disclosure provides for fully independent network nodes which can provide all communication and application capabilities to end users. In some embodiments, the mobile network nodes of the present disclosure are distributed mobile LTE cores configured to communicate with other cores automatically, when sensing cores in the vicinity. Accordingly, an LTE core of the present disclosure provides for, e.g., controlling standard RAN devices (e.g., eNodeB, CPE, mobile devices) and sharing information with other mobile LTE cores to form a unified cluster. In some embodiments, an LTE core of the present disclosure is configured to share within a cluster information such as, e.g., application information, users information, RF information, routing information, node status information, conflict information, security information, and the like. In some embodiments, the present LTE core is configured to control, e.g., standard eNodeB (base stations) with desired frequency, based on cluster topology, to allow efficient traffic flow.

In some embodiments, the present disclosure provides for wireless mobile network nodes configured to create ad-hoc networks by connecting to one another. In some embodiments, a wireless mobile network node is a relatively small-size mobile cellular and/or wireless autonomous entity that consists of access radio (e.g., eNodeB), a core network, a backhaul radio device (e.g., CPE), and local application servers (e.g., voice communication, data communication, push-to-talk communication). A mobile network node can act independently and serve its end users, such as by providing local applications, without the need to connect to any external network.

Figure 2:
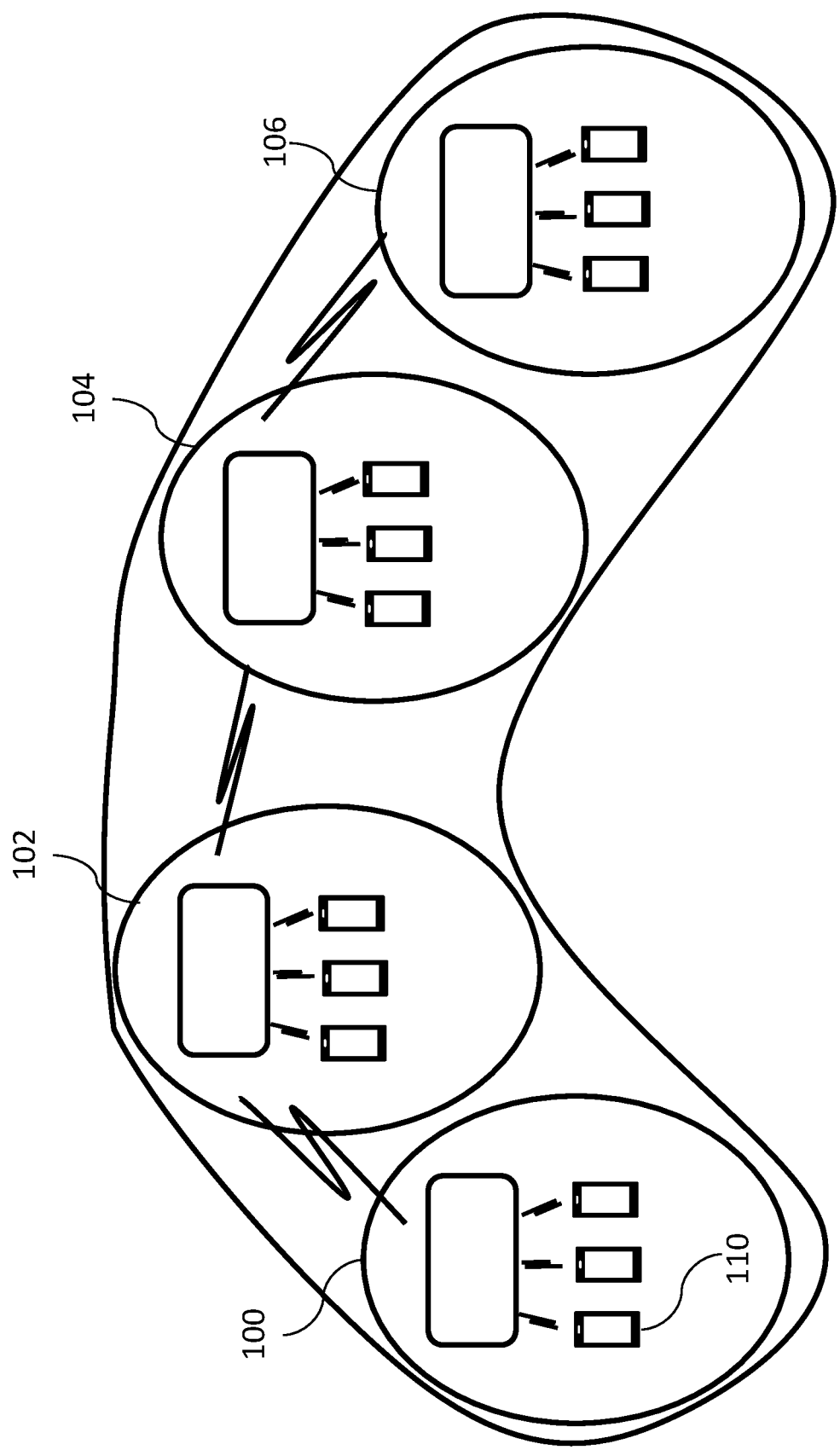
FIG. 2 is a schematic illustration of an exemplary ad hoc mobile network nodes cluster, according to an embodiment.

FIG. 2 is a schematic illustration of an exemplary ad hoc cluster of mobile network nodes, according to an embodiment. In some embodiments, a mobile network node 100 may, e.g., automatically connect to one or more other mobile network nodes, e.g., 102, 104, 106 to from a mobile cluster, so as to provide connectivity to end users of the several networks. In some embodiments, two or more mobile network nodes, e.g., 100, 102, may use the wireless backhaul to connect to one another to create an on-the-fly wireless ad-hoc network. In some embodiments, a cluster of mobile network nodes allows all end users of each of the cluster's constituent network cores to use the aggregated wireless coverage area. For example, it enables end user 110 to utilize various applications and allows communication between users of all mobile network nodes comprising the cluster.

In some embodiments, the present disclosure further provides for a special algorithm to optimize the mobile network nodes cluster topology by changing the connectivity links between the mobile network nodes. In some embodiments, optimized routing may be based on a variety of parameters, e.g., current node loads, etc. The connectivity links may be controlled either by specific command of the mobile network node's core to the backhaul device or by the mobile network node's core controlling the access radio (e.g., eNodeB). The mobile network nodes learn the topology, wherein it is then shared among the mobile network nodes.

In some embodiments, the present disclosure allows the mobile network nodes to form an ad-hoc network, and to select dynamically, in a distributed manner, a root mobile network node in the cluster, so that all mobile network nodes' access radios are controlled from selected mobile network node core. The root is calculated and elected to be in the most optimal mobile network node location in relation to the network topology and a plurality of other network parameters.

In some embodiments, the present disclosure allows the mobile network nodes to form an ad-hoc network, to select dynamically, in a distributed manner, one or more anchor application servers in the cluster, so that all mobile network nodes' are served from selected mobile network node. The anchor is calculated and elected to be in the most optimal mobile network node location in relation to the network topology and other network different parameters.

Figure 3:
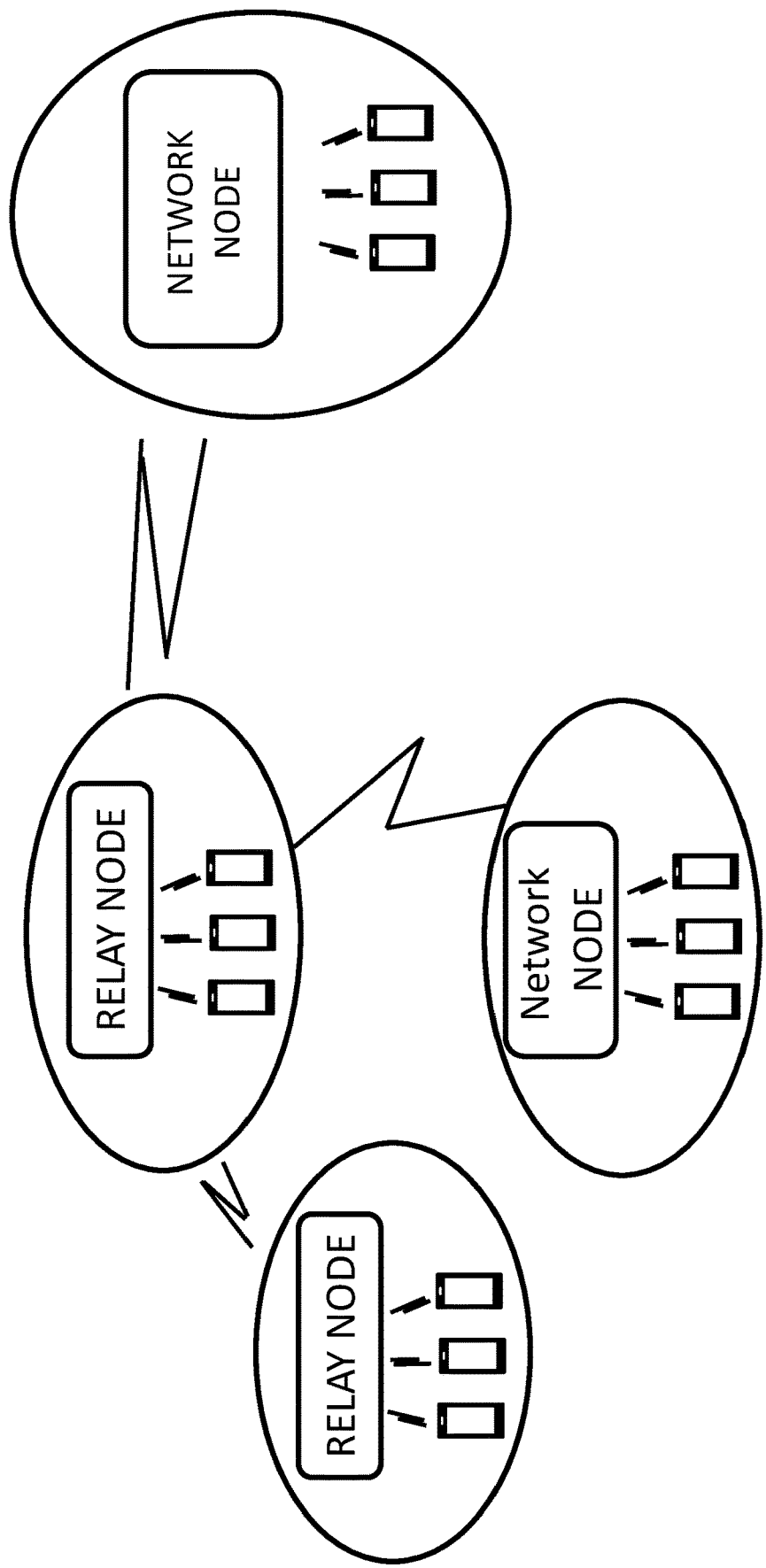
FIG. 3 is a schematic illustration of a mobile network nodes acting as a relay, according to an embodiment.

In some embodiments, a network node cluster of the present invention provides for direct node-to-node connections. FIG. 3 is a schematic illustration of a mobile network nodes acting as a relay, according to an embodiment. In some embodiments, cluster nodes may be layered, such that one or more nodes act as relays to sub-nodes in the cluster.

In some embodiments, an optimizing algorithm of the present disclosure provides for maximum connectivity by, e.g., loop prevention, as well as minimum communication delay.

In some embodiments, each of the mobile network nodes may act as a standalone mobile wireless network which provides communication services to end users. In some embodiments, a mobile network node may be connected to an external network (e.g., the Internet).

In some embodiments, a cluster of mobile network nodes of the present disclosure provides for distributed authentication of end users, so that end users of a network node can be authenticated in other network nodes within the cluster without the need to be pre-configured within that network node.

In some embodiments, a cluster of network nodes of the present disclosure are configured to optimize the mobile network nodes topology, such that mobile network nodes may change their connection to other mobile network nodes on the fly.

In some embodiments, a mobile network node of the present disclosure transmits Access Radio data over a backhaul function to the cluster of mobile network nodes, to be terminated by an anchor mobile network node.

In some embodiments, each of the network nodes comprises, e.g., a radio access network (RAN) capability (e.g., an eNodeB), at least one consolidated core network, a backhaul radio functionality (e.g., a Long-Term Evolution (LTE) client premise equipment (CPE)), as well as one or more local application servers (e.g., data, voice, etc.).

In some embodiments, each network node is configured to automatically identify and form an ad-hoc cluster with one or more other network nodes, based, at least in part, on a proximity parameter.

In some embodiments, a network node may be designated as a cluster head/root/leader and manage communication among network nodes.

In some embodiments, the backhaul device can be wireless, in-band or out-of-band, wireline, or any other connectivity technology, including, but not limited to, 2G, 3G, WLAN, WiMAX, LTE, and fixed access (Ethernet, DSL, cable and fiber). In some embodiments, an in-band wireless device can be a regular CPE either working in bridge mode, NAT mode, or router mode. In some embodiments, the node includes algorithm that is sensitive to the backhaul type and can utilize the backhaul characteristics.

In some embodiments, the node includes an algorithm and communication protocol to allow distributed authentication so users of different mobile network nodes can be authenticated in other mobile network nodes without the need to be pre-configured.

In some embodiments, the mobile network nodes run an algorithm that optimize the mobile network nodes topology. The mobile network nodes network by exchanging and sharing information can decide to change the connectivity topology, so mobile network node may change their connection to other mobile network nodes on the fly.

In some embodiments, the node uses a bridged type/router mode CPE to communicate with other nodes. In some embodiments, a cluster topology may comprise one or more network nodes connected to other network nodes through the backhaul and/or the access radio entity (e.g., eNodeB). In some embodiments, a protocol located within the network node automatically learns, e.g, the topology, available services, security information, and/or the routing between the connected nodes.

In some embodiments, a mobile network node of the present disclosure may provide for node-to-node communication through a macro cellular tower, and/or for a network node to act as a relay. In some embodiments, a network node in relay mode transmits the traffic thorough the backhaul CPE to a cluster RAN anchor, which terminates the RAN interface and serves the end users. In some embodiments, there may be several RAN anchors in a given cluster.

In some embodiments, a mobile network node of the present disclosure provides for multi-access edge computing (MEC) capability at the edge of the network, wherein running applications and performing related processing tasks closer to the end user reduces network congestion and leads to better applications performance, e.g., for applications such as high resolution maps, local video recording, internet of things, video analytics, local communication, security, and the like. In some embodiments, MEC technology is implemented at the cellular base stations or other edge nodes, and enables flexible and rapid deployment of new applications and services for end users.

Figure 4:
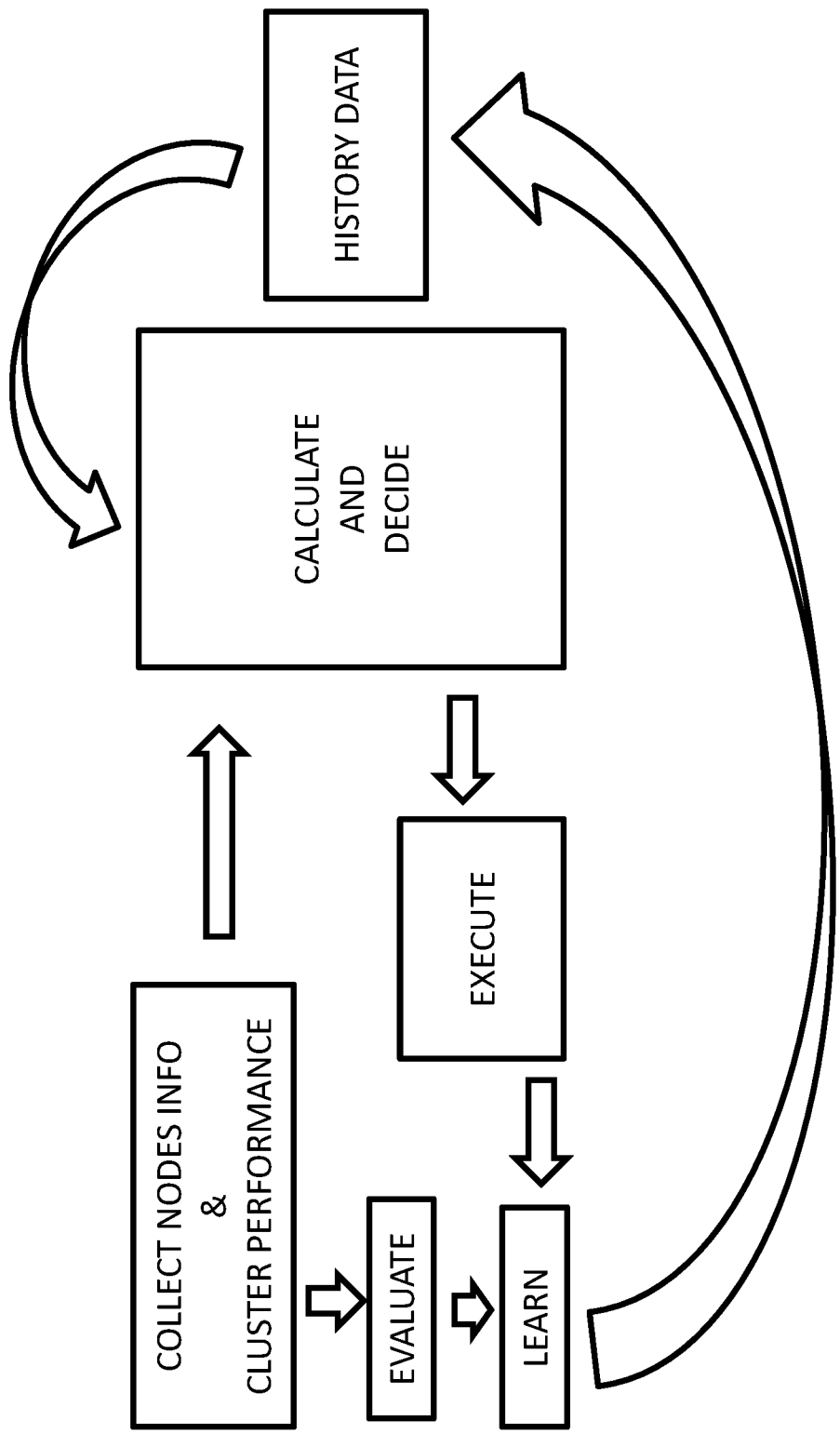
FIG. 4 schematically illustrates a cluster topology learning and optimization algorithm, according to an embodiment.

FIG. 4 schematically illustrates a cluster topology learning and optimization algorithm, according to an embodiment. In some embodiments, a cluster topology learning algorithm is provided, which is configured to continuously learn and optimize overall ad-hoc cluster topology and performance. In some embodiments, a cluster topology learning algorithm of the present disclosure is configured to determine one or more anchor nodes which act as application servers for an entire cluster, based on topology, nodes' load weights, etc. In some embodiments, an algorithm for electing a leader in a network with dynamically changing communication topology is presented. The algorithm ensures that, regardless of topology changes, every network connected component contains a unique leader/root.

In some embodiments, leader and/or root election is an important primitive for distributed computing, as a subroutine for any application that requires the selection of a unique processor among multiple candidate processors, e.g., group communication systems, video conferencing, multiplayer games, etc. In some embodiments, one or more known leader election algorithms may be employed, e.g., as described in Ingram, R., "A leader election algorithm for dynamic networks with causal clocks", Distrib. Comput. 26, 75-97 (2013).

Cluster Management

In some embodiments, a cluster management algorithm of the present disclosure may be configured to dynamically adjust cluster root and anchor designations, in response to changing cluster topology.

In some embodiments, each node is continuously aware of its connection status, and knows whether it is a cluster root/leader. In some embodiments, this shared knowledge may be kept updated by means of, e.g., keep-alive messages and acknowledgement messages.

In some embodiments, a cluster of network nodes may comprise a designated 'root' or cluster head configured for managing anchor assignment. In some embodiments, a cluster root self-designates based on a plurality of parameters.

In some embodiments, each cluster node sends a periodic report upstream to the node to which it is connected. In some embodiments, the report includes all topological data the node knows, including details of subnets, servers, security and other information it holds itself.

In some embodiments, a node receiving a report will add its contents to its own report, which in turn is being sent upstream to adjacent nodes. Accordingly, at a stable cluster state, a report form a node includes complete topological information of the subnetwork downstream from it. In some embodiments, by this method, information may be propagated to the root/leader node, such that the root/leader holds complete topological information of the cluster. In some embodiments, topological reports by network nodes may be transmitted to at least one connected network node that is located upstream, downstream, and/or laterally in relation to the transmitting node. In some embodiments, topological reports may be provided to connected network nodes located within one hop, two hops, and/or multi-hops from the transmitting node.

Based on such information, a root/cluster may be able to designate anchors nodes for the various applications, consistent with specified routing parameters. In some embodiments, anchor designation may be based, at least in part, on a plurality of considerations and parameters, including, but not limited to:

Centralization of data path, e.g., whether data passes through the server or directly peer-to-peer;
minimizing hops passing through the anchor;
minimizing delay passing through the anchor;
load balancing demand;
utilizing the widest bandwidth path possible; and/or
historical data regarding evaluation scores of similar past topology and/or anchor selection and/or other cluster-related selection choices.

In some embodiments, each type of anchor (i.e., each type of application served) has an appropriate policy implemented in the leader/root.

In some embodiments, the cluster root/leader is configured to select an application anchor node, based, at least in part, on node information regarding application capability. In some embodiments, for each application, the cluster root/leader may consider all nodes reporting a specified capability as anchor candidates. In some embodiments, a cluster root/leader may rank each candidate based on, e.g., simulating network performance for each candidate when acting as an anchor, and selecting a candidate based on such ranking.

In some embodiments, anchor selection takes previous selections into account, to balance network load. For each application, the chosen anchor is announced by the leader to all bubbles connected to it, and from them it propagates through the network.

Upon connection of two or more network nodes, the respective EPCs/network node core of each node automatically communicate with one another to share capabilities, overall cluster topology, location of application servers, security, management information and user information.

In some embodiments, the network nodes decide which of the nodes may act as a root or cluster head, and which nodes will provide application services to the cluster as a whole. In some embodiments, this process is executed continuously, to permit adaptation of root and anchor designation to dynamically changing cluster topology.

Figure 5A:
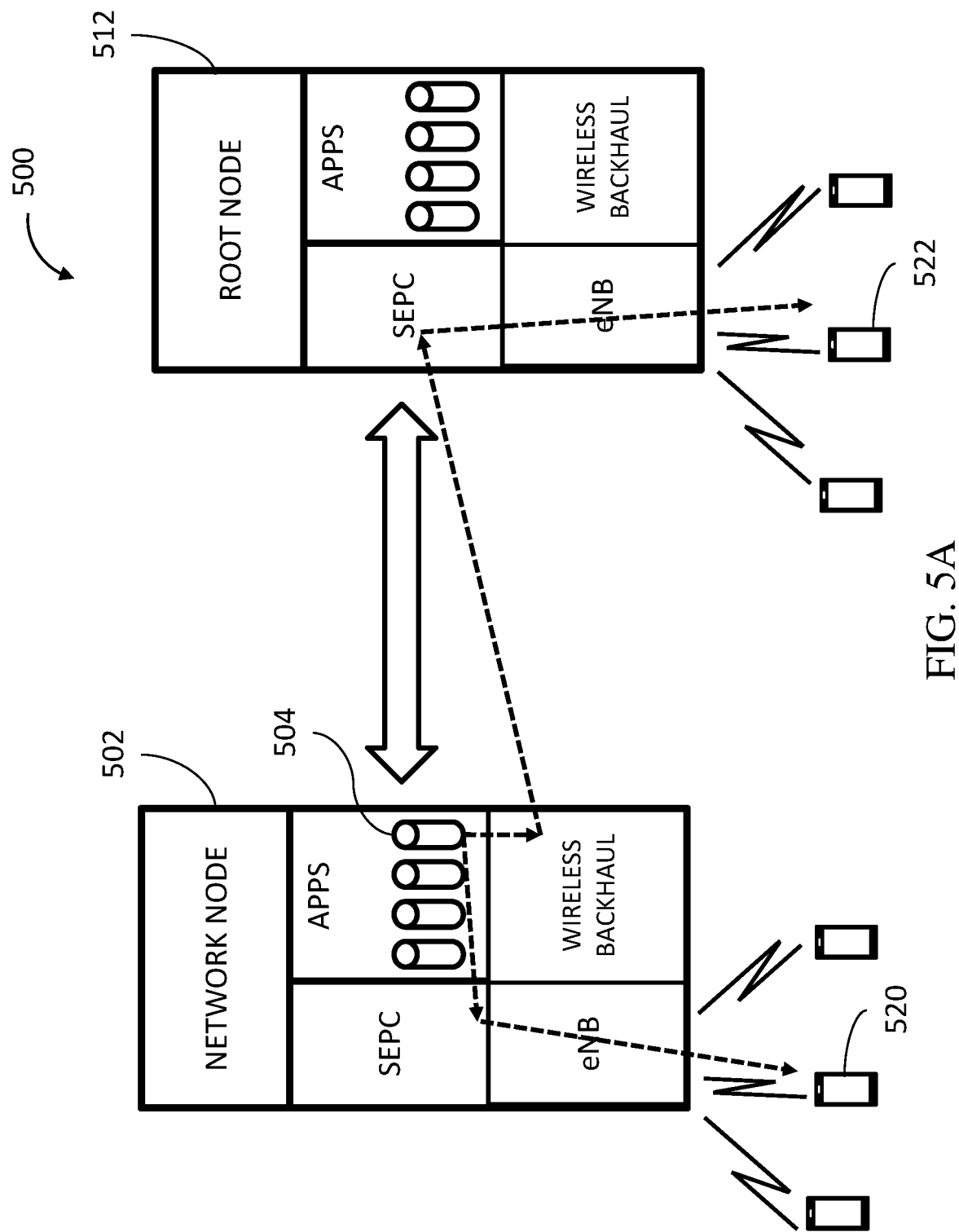
FIGS. 5A-5B schematically illustrates various cluster topologies, according to an embodiment.
Figure 5B:
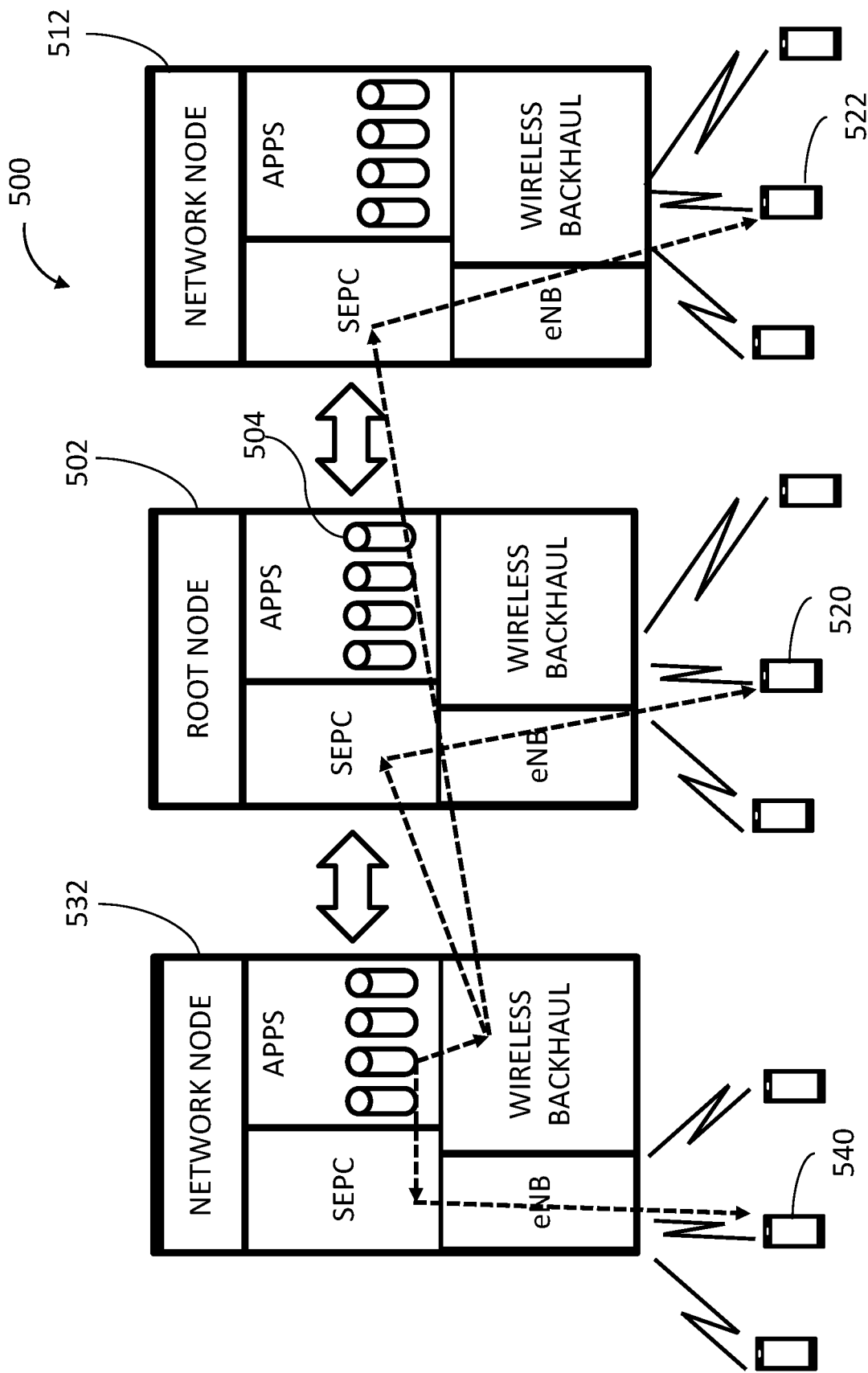

FIG. 5A is a schematic illustration of a cluster 500 comprising nodes 502 and 512. As can be seen, within cluster 500, node 512 is designated cluster root, and application server 504 of node 502 is an anchor node providing a specified service (e.g., data, PTT) to the entire cluster. Accordingly, both end users 520 of node 502 and 522 of node 512 receive services seamlessly from application 504. In some embodiments, as illustrated in FIG. 5B, when a new node 532 joins the cluster, the nodes of the dynamically-changed cluster adjust to the new topology and decide on the designated root and where to anchor the application servers. For example, node 502 is designated root of the cluster, and the application servers are now anchored in new node 532, which, e.g., provides an optimal application throughput and performance within the cluster.

In some embodiments, the designation of anchor node which provides application services to the entire cluster enables to reduce the communication throughput throughout the cluster between the bubbles. For example, in cases where applications do not support a distribution concept, the bandwidth between nodes is not wide enough, or local traffic may be high.

In some embodiments, multiple anchors of the same service type may co-exist in the same nodes cluster, wherein services may be provided to cluster users by several partially detached sub-networks within the cluster, and/or within a hierarchical structure. For example, most nodes of a cluster that has attached to a larger network, may be still served inside the original node, without access to external nodes and their users, whereas a small number of nodes or some entities served by them can access the external network as well. This hierarchical anchor structure is achieved either by some nodes acting as 'semi-roots,' having the ability to block or limit access between two sides of a network, or by employing layers of access, denying some services from lower access nodes.

In some embodiments, anchor hierarchy ability can be employed, e.g., to overcome scenarios in which connection lines to a single centralized anchor in a cluster are loaded to an extent that the overall communication in the cluster deteriorates, scenarios in which connectivity at certain points in the cluster is poor, and/or scenarios in which isolation of certain parts is required for reasons of security, etc. In some embodiments, implementing a hierarchical anchor setup is done automatically and centrally by the cluster root/leader according to a plurality of parameters, as further detailed above. In some embodiments it is done automatically by nodes within the cluster that have been configured and enabled to act as local roots/leaders of a subnet of the cluster, according to similar criteria. In some embodiments, it is done manually by an administrator of the cluster or of a subnet of the cluster.

Along with the anchor hierarchy ability, in some embodiments, certain nodes can be specifically designated or configured to act solely as roots/leaders of either a subnet of the cluster or of an entire cluster. When designated or configured as such, those 'sub-root' nodes both become selective in any connections they keep with the rest of the cluster, and control the nodes which are members of their own subnet to connect such that all of them deem the sub-root as their leader.

The implementation of anchor hierarchy practically leads to a smaller amount of active and enabled routing commands in nodes which are subordinate to a subnet root/leader. In some embodiments, the control of routing abilities is done centrally by the subnet root/leader commanding its subordinates to limit and/or disable their abilities. In some embodiments, it is done by self-discipline of each node configured to be part of an active anchor hierarchy network and limit its own abilities.

In some embodiments, each node may comprise a duplicative 'local' and 'global' application servers of the same kind, wherein a local application handles services to end users of the node, and a global server handles service requests from users off other nodes. Accordingly, communication between users of different nodes is handled by, e.g., a global communication server that is selected by the cluster management algorithm. Each node in turn is responsible for routing the users according to the selected topology.

Figure 6:
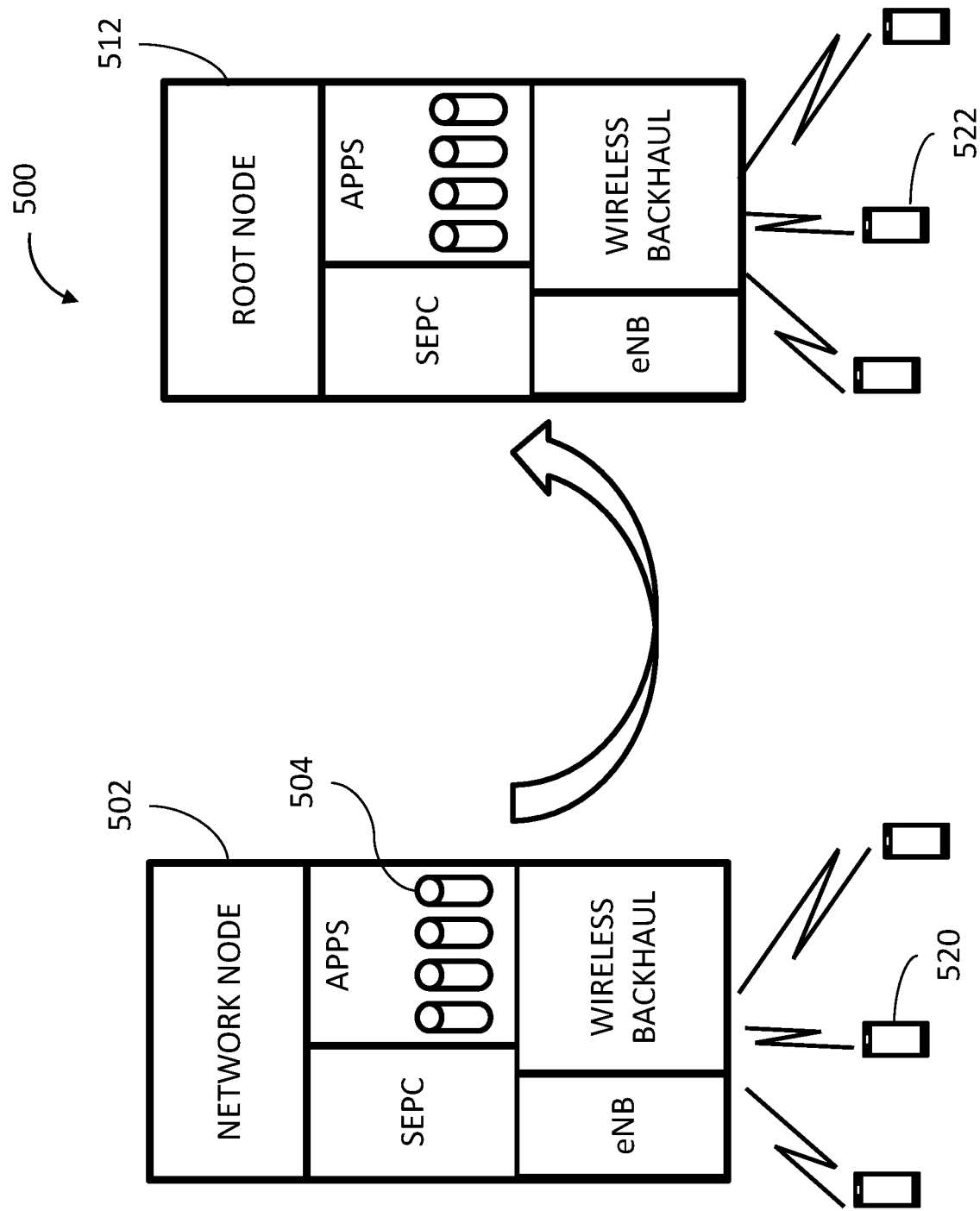
FIG. 6 schematically illustrates a cluster loop prevention process, according to an embodiment.

With reference to FIG. 6, in some embodiments, the network node communication protocol comprises active prevention of 'loops' in the network, which may be performed at the physical or logical layers. Accordingly, in some embodiments, e.g., LTE connections are not allowed and/or are actively disconnected, if a communications 'loop' is created within the cluster, to prevent the creation of isolated networks which cannot transfer data among them, even if they are physically in each other's communication range. In addition, in some embodiments, by preventing 'loops,' all cluster topologies may be modelled as tree-type graphs.

When two separate networks 'encounter' and connect to form one network, the choice of a single mutual anchor for a specified service is always performed by the leader/root of the new unified network.

In some embodiments, cluster topology learning may be performed by a proactive messaging process. For example, each network node may send a message which travels upstream and then downstream once. In some embodiments, the upstream message traversal is done by each node at regular intervals, wherein each node reports its traversal information, along with all information received from other nodes. In some embodiments, the upstream traversal data is received by the root/leader. In some embodiments, once the root/leader identifies a relatively stable cluster topology, optimal network anchor assignment is determined. In some embodiments, downstream messaging traversal may be triggered by the root/leader, wherein a message may travel from each node to all nodes connected to it.

Cluster Self-Healing Capability

A cluster of nodes of the present disclosure may provide for a self-healing capability, which allows for an automated resolution of cluster configuration issues and/or conflicts, e.g., when nodes are connected to each other.

A conflict may be defined as a situation in which configurations of different network entities within nodes in the same cluster lead to identical, overlapping, and/or ambiguous identification information, such that some or all nodes in the cluster cannot reach those entities or will reach different entities. In some cases, a conflict may comprise network entity configurations which do not fit best within the setup and configurations of the entire cluster in terms of overall cluster performance. Conflicts may be remedied in some case by means of altering, deleting, or disabling these configurations at the respective said nodes. For example, configurations of IP addresses or subnets, identification of hardware, address and type of application servers, RF frequencies, RAN parameters and security information and association may be node-related parameters which may lead to potential conflicts within a cluster environment, and which may be remedied by altering and/or modifying relevant parameters of a node.

In some embodiments, a conflict resolution mechanism of the present disclosure provides for a collaborative resolution process, wherein network nodes are communicating with one another. For example, in case of a conflict, a first network node may attempt to modify a cluster configuration value, and/or cease from using the conflicted cluster resource. In some embodiments, the cluster root node may be configured to verify the absence of conflicts in cluster topology, and attempt to resolve the conflict by modifying a cluster configuration.

Accordingly, in some embodiments, a cluster of nodes of the present disclosure may be configured to execute an automatic self-healing mechanism to resolve conflicts among configurations of the different nodes constituting the cluster. Because one or more network nodes may be incorrectly configured, the automated self-healing mechanism comprises having all network nodes distribute their configurations throughout the cluster.

In some embodiments, a conflict resolving process includes at least an identification of a conflict by one or more nodes in the cluster, a notification of the conflict at least to the nodes involved in the conflict, i.e. at least the nodes causing the conflict and the nodes which should be involved in the resolution of the conflict, a unified decision of a course of resolution, and removal of the conflict causing configuration elements by the nodes responsible for them.

In some embodiments the notifications also include suggestions for alternative configurations which will be conflict-free. In some embodiments, a conflict must at least be identified by the root of the cluster while it may be identified by other nodes in the cluster as well.

In some embodiments, a conflict resolution process of the present disclosure further provides for configuration modification to resolve any identified conflict, wherein the modified configuration may be further distributed to all nodes of the cluster.

In some embodiments, all nodes retain a set of conflict resolution rules regarding, e.g., limiting, removing, and/or disabling a conflicted node. Accordingly, a cluster of the present disclosure may be configured for a unified course of resolution for the conflict. In some embodiments, a network node having a configuration which must be altered or removed, is responsible for executing that action. In some embodiments, more than one node should remove its configuration and possibly reconfigure the node. The self-healing mechanism process, in some embodiments, an iterative process of trial and error, in which conflict-causing nodes suggest new configurations and the network is checked again for conflicts due to the new configurations.

In some embodiments, a node that has changed its configurations for the purpose of healing of the network, may be configured to retain a history of its previous configurations, and may return to an older configuration once it identifies a change in network topology or a change in other configurations in the network, such that the conflict would not occur in the network setting even with the node's old configurations. Similarly, in some embodiments, a node may be configured to retain records of new temporary configurations it uses, along with details of the conflict they were supposed to resolve and what was the measure of success in the resolution.

A node may employ the self-healing mechanism even within itself, and even if it is in a standalone condition. This is useful to detect logical or erroneous manual configurations, and enables the machine to fix them on the fly.

Distributed Authentication

In some embodiments, the present algorithm may be configured to handle user profiles and privilege in a hierarchal manner. In some embodiments, the method may comprise causing each node to disseminate essential end user authentication information to all other nodes in a cluster.

Figure 7:
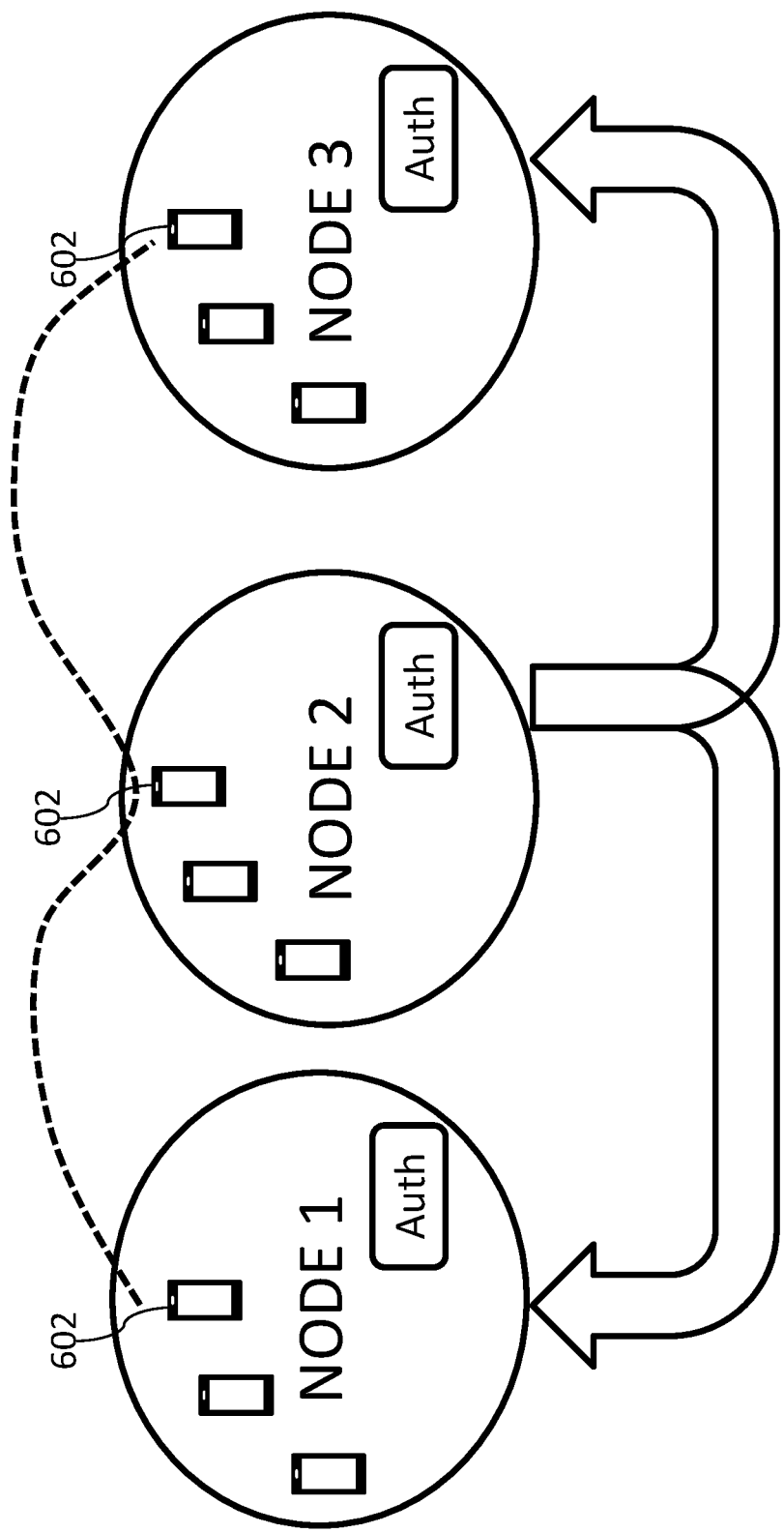
FIG. 7 illustrates a protocol for distributed end user authentication, according to an embodiment.

FIG. 7 illustrates a protocol for end user authentication when an end user, e.g., roams between nodes within a cluster. For example, end user 602 roams from node 1, to node 2, to node 3. When, e.g., node 2 detects end user 602 within the range of its local services, node 2 may search for the anchor authenticator and update its learning tables and neighbors.

Functional Steps

Figure 8:
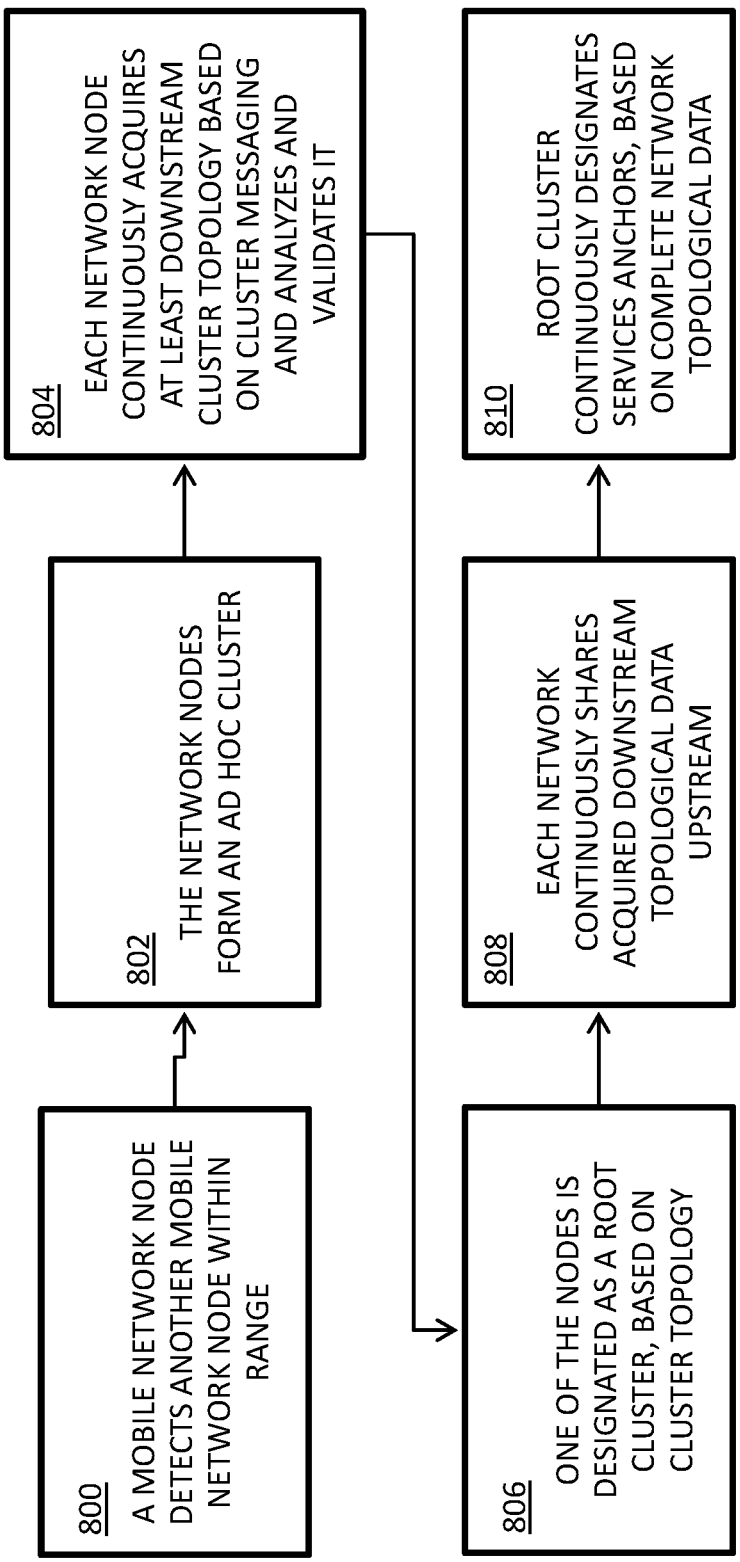
FIG. 8 is a flowchart illustrating exemplary functional steps in a process for automated formation and management of ad-hoc mobile wireless network clusters, according to an embodiment.

Reference is now made to FIG. 8, which is a flowchart illustrating exemplary functional steps in a process for automated formation and management of ad-hoc mobile wireless network clusters.

At a step 800, at mobile cellular network node detects at least one other mobile cellular network node within a specified range, wherein each node comprises, e.g., an eNodeB, an EPC or smart EPC, one or more application servers, and a wireless transceiver.

At a step 802, the network nodes dynamically form an ad-hoc clusters of nodes, based on proximity detection, wherein the cluster topology may be hierarchical.

At a step 804, each network node continuously acquires, analyzes and validates cluster topology information, wherein the information comprises at least cluster topological structure downstream from the acquiring node.

At a step 806, one of the nodes is designated as a cluster root, based on the learned topological information.

At a step 808, each node continuously shares acquired at least downstream topological data with its at least upstream nodes in the cluster.

At a step 810, the designated cluster root continuously elects services anchors from among the nodes, based on network topological data received form the nodes. Each selected node will provide its designated services to all end users of all nodes. In some embodiments, each network node currently not designated to provide a service, deactivates its service capability, to optimize computational resources usage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of modified purpose computer, special purpose computer, a general computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   forming a cluster comprising at least two network nodes, wherein each of said network nodes comprises at least a wireless transceiver and at least one application server;
   continuously acquiring, by each of said network nodes in said cluster, cluster topological data from at least some other network nodes;
   continuously transmitting, by each of said network nodes in said cluster, to at least some of said other network nodes in said cluster, said acquired topological data;
   designating, based at least in part on said transmitted topological data, a cluster head; and
   selecting, by said cluster head, at least one of said other network nodes in said cluster to provide one or more services associated with its respective at least one application server, wherein said one or more services are provided to all other network nodes, and wherein said cluster topological data comprises network node configuration information, selected from a list consisting of an address of at least one application server, a type of at least one application server, at least one radio frequencies (RF) parameter, at least one radio access network (RAN) parameter, and security information.

2. The method of claim 1, wherein at least one of said acquiring and said transmitting is only from said other network nodes that are one-hop neighboring network nodes of said network node.

3. The method of claim 2, wherein, with respect to said acquiring, each of said one-hop neighboring networks is located downstream from said network node, and, with respect to said transmitting, each of said one-hop neighboring networks is located upstream from said network node.

4. The method of claim 1, wherein each of said network nodes is a mobile cellular network node, and wherein each of said mobile cellular network nodes comprises radio access network (RAN) entity, a core network entity, a backhaul radio device, and one or more application servers.

5. The method of claim 1, wherein said application server comprises at least one application selected from the group consisting of: voice communication, data communication, push-to-talk communication, and video communication.

6. The method of claim 1, wherein said acquiring and said transmitting comprises acquiring and transmitting information regarding said at least one application server of each network node.

7. The method of claim 1, wherein said selecting is based, at least in part on cluster parameters selected from the group consisting of: centralization of data path, minimization of hops among network nodes, minimization of transmission delays, network node load balancing, maximization of bandwidth, and previous selection choices by said cluster head.

8. The method of claim 1, wherein at least one of said network nodes turns off its respective application server when not included in said selecting.

9. The method of claim 1, wherein said network node configuration information further comprises at least some of: internet protocol (IP) addresses, hardware identifiers, Media Access Control (MAC) address, and address of application server.

10. The method of claim 1, wherein each of said network nodes is configured to detect a conflict with another of said network nodes based, at least in part, on said configuration information and wherein said network node is further configured to transmit a message to said another network node, and wherein said message comprises data with respect to said detected conflict.

11. A system comprising:
at least two network nodes, each comprising:
at least a wireless transceiver;
at least one application server;
at least one hardware processor; and
a non-transitory computer-readable storage medium having stored thereon program instructions, the program instructions executable by the at least one hardware processor to:
form a cluster comprising said at least two network nodes, wherein each of said network nodes continuously acquires cluster topological data from at least some other network nodes in said cluster,
continuously transmit, by each of said network nodes in said cluster, to at least some of said other network nodes in said cluster, said acquired topological data;
designate, based at least in part on said transmitted topological data, a cluster head; and
select, by said cluster head, at least one of said other network nodes in said cluster to provide one or more services associated with its respective at least one application server, wherein said one or more services are provided to all other network nodes
wherein said cluster topological data comprises network node configuration information, selected from a list consisting of an address of at least one application server, a type of at least one application server, at least one radio frequencies (RF) parameter, at least one radio access network (RAN) parameter, and security information.

12. The system of claim 11, wherein at least one of said acquiring and said transmitting is only from said other network nodes that are one-hop neighboring network nodes of said network node.

13. The system of claim 12, wherein, with respect to said acquiring, each of said one-hop neighboring networks is located downstream from said network node, and, with respect to said transmitting, each of said one-hop neighboring networks is located upstream from said network node.

14. The system of claim 11, wherein each of said network nodes is a mobile cellular network node, and wherein each of said mobile cellular network nodes comprises at least an access radio, a core network, a backhaul radio device, and one or more application servers.

15. The system of claim 11, wherein said application server comprises at least one application selected from the group consisting of: voice communication, data communication, push-to-talk communication, and video communication.

16. The system of claim 11, wherein said acquiring and said transmitting comprises acquiring and transmitting information regarding said at least one application server of each network node, and wherein said selecting is based, at least in part, on said information regarding said at least one application server of each network node.

17. The system of claim 11, wherein said selecting is based, at least in part on cluster parameters selected from the group consisting of: centralization of data path, minimization of hops among network nodes, minimization of transmission delays, network node load balancing, maximization of bandwidth, and previous selection choices by said cluster head.

18. The system of claim 11, wherein said network node configuration information further comprises at least some of: internet protocol (IP) addresses, hardware identifiers, Media Access Control (MAC) address, address of application server, type of application server, radio frequencies (RF), radio access network (RAN) parameters, and security information.

19. The system claim 11, wherein each of said network nodes is configured to detect a conflict with another of said network nodes based, at least in part, on said configuration information, and wherein said network node is further configured to transmit a message to said another network node, and wherein said message comprises data with respect to said detected conflict.

20. A computer program product comprising a non-transitory computer-readable storage medium having program instructions embodied therewith, the program instructions executable by at least one hardware processor to operate at least two network nodes, wherein each of said network nodes comprises at least a wireless transceiver and at least one application server, to:
form a cluster comprising said at least two network nodes;
continuously acquire, by each of said network nodes in said cluster, cluster topological data from at least some other network nodes;
continuously transmit, by each of said network nodes in said cluster, to at least some of said other network nodes in said cluster, said acquired topological data;
designate, based at least in part on said transmitted topological data, a cluster head; and
select, by said cluster head, at least one of said other network nodes in said cluster to provide one or more services associated with its respective at least one application server, wherein said one or more services are provided to all other network nodes
wherein said cluster topological data comprises network node configuration information, selected from a list consisting of an address of at least one application server, a type of at least one application server, at least one radio frequencies (RF) parameter, at least one radio access network (RAN) parameter, and security information.

21. The method of claim 1, wherein each of said network nodes is associated with at least one end user, and wherein each of said one or more services is provided to the at least one associated end users.

22. The method of claim 21, wherein each of said one or more services is provided to one or more end users of said other network nodes.

23. The method of claim 4, wherein the access radio entity is selected from a list consisting of: a base station, an eNodeB entity and a gNodeB entity.

24. The method of claim 1, wherein at least one of said other network nodes comprises selecting two or more of said other network nodes in said cluster to provide two or more services associated with respective two or more application servers.

25. The method of claim 1, wherein selecting at least one of said other network nodes to provide one or more services is based on said information regarding at least one application server of each network node.

26. The method of claim 25, wherein said selecting comprises, for each application:
considering all nodes reporting a specified capability as candidates;
ranking each candidate based on simulation of network performance for each candidate; and
selecting a candidate based on said ranking.

27. The method of claim 4, wherein the core network entity comprises an Evolved Packet Core (EPC) entity or a smart EPC entity.

* * * * *